United States Patent [19]
Hodson

[11] Patent Number: 5,678,435
[45] Date of Patent: Oct. 21, 1997

[54] BICYCLE LOCKING MECHANISM

[76] Inventor: James M. Hodson, 37 Pond Rd., Wilton, Conn. 06897

[21] Appl. No.: 514,926

[22] Filed: Aug. 14, 1995

[51] Int. Cl.$^6$ .................... E05B 73/00; B62H 5/10
[52] U.S. Cl. .................... 70/233; 70/49; 70/261
[58] Field of Search .................... 70/30, 49, 233, 70/261, 234, 235, 236

[56] References Cited

U.S. PATENT DOCUMENTS

| | | | |
|---|---|---|---|
| 3,910,602 | 10/1975 | Lindner | 70/233 |
| 4,007,614 | 2/1977 | Schott et al. | 70/234 |
| 4,064,714 | 12/1977 | Treslo | 70/233 |
| 4,284,290 | 8/1981 | Ragsdale | 70/236 |
| 4,490,997 | 1/1985 | Hughes et al. | 70/18 |
| 4,811,577 | 3/1989 | Webster et al. | 70/58 |
| 4,986,095 | 1/1991 | Chou et al. | 70/18 |
| 5,018,374 | 5/1991 | Montano . | |
| 5,065,603 | 11/1991 | Kloke . | |
| 5,156,031 | 10/1992 | Gaul . | |
| 5,251,464 | 10/1993 | Halter . | |
| 5,289,704 | 3/1994 | Johnson . | |
| 5,325,689 | 7/1994 | Warner | 70/233 |

FOREIGN PATENT DOCUMENTS

| | | | |
|---|---|---|---|
| 2276210 | 1/1976 | France | 70/233 |
| 539919 | 12/1931 | Germany | 70/234 |
| 3046810 | 7/1982 | Germany | 70/233 |
| 3330840 | 3/1985 | Germany | 70/234 |
| 7806670 | 12/1979 | Netherlands | 70/233 |

*Primary Examiner*—Darnell M. Boucher
*Attorney, Agent, or Firm*—John R. Doherty

[57] ABSTRACT

A bicycle locking mechanism is provided including a tubular member which may form part of a bicycle frame, such as the tubular seat post, for example, and an elongated, collapsible, securing element for securing the bicycle frame to an object such as a post or bicycle rack. The elongated, collapsible, securing element has first and second ends and is collapsed in size to a length which is no greater than the length of the tubular member. The securing element fits substantially within the tubular member, when not in use, and is of sufficient length when withdrawn from the tubular member to wrap around an object for securing the bicycle frame thereto. A hinge pin assembly is provided for attaching the first end of the securing element to the tubular member. The securing element may be an elongated, interconnected, linkage assembly or it may consist of a flexible cable.

20 Claims, 8 Drawing Sheets

BICYCLE LOCKING MECHANISM

BACKGROUND OF THE INVENTION

1. Field of the Invention

This invention relates generally to bicycle locking mechanisms and more specifically to a bicycle lock which is integral to the bicycle frame.

2. Description of the Prior Art

Various bicycle locks, chains, cables, and solid bar type have been previously used to secure bicycles to fixed objects such as fence posts, bike racks, and the like. Although they all to some degree provide security, the issue of portability is often ignored as a trade off. To overcome the portability issue, prior inventions have taken the aforementioned existing locking mechanisms and designed a holder or bracket accessory to accommodate the need to conveniently carry the lock apparatus on the bicycle. The result is either additional hardware bulk and weight on the bicycle, or an unorganized method of wrapping cables, chains, and locks around the saddle post.

Additionally, with the increasing portability, adjustability, and component interchange of modern bicycles, quick release type mechanisms have penetrated the bicycle component market. Wheels and seat posts are often removable in a few seconds to accommodate portability and adjustability. This highly desired feature, however, has the inherent drawback of making the individual components less "theft proof". As a consequence, either more locks are needed to secure the individual components, or longer more complicated cabling schemes are implemented to thread through as many of the easily removable components as possible. In turn, added weight and bulk become part of the locking mechanism.

In particular, the need to secure the bicycle seat or saddle has become more necessary as new saddle designs progress. Saddles can now be of significant cost, and have been very difficult to adequately secure. Due to the de facto mechanical standards used for interchange of saddles and posts, there is very little space mechanically to incorporate security into the saddle itself.

Accordingly, it is a primary object of the invention to provide a bicycle locking mechanism which offers both security and inherent portability.

Another object of the invention is to provide a bicycle locking mechanism which attaches integrally to the bicycle seat post and saddle itself while in the locked state.

Still another object of the invention is to provide a bicycle locking mechanism which does not distract visually from the intended aesthetic look of the bicycle.

Yet another object of the invention is to provide a bicycle locking mechanism which adds little or no mechanical bulk to the bicycle that can otherwise interfere with cycling and/or induce unwanted rattling while cycling.

SUMMARY OF THE INVENTION

This invention is directed to a unique bicycle locking mechanism which is portable and completely self contained within the confines of the bicycle frame itself. Broadly, the bicycle locking mechanism of the invention comprises a tubular member which forms part of the bicycle frame, such as the tubular seat post, for example, and an elongated, collapsible, securing element for securing the bicycle frame to an object such as a post or bicycle rack. The elongated, collapsible, securing element has first and second ends and is collapsed in size to a length which is no greater than the length of the tubular member. The securing element fits within the tubular member when not in use, and is of sufficient length when withdrawn from the tubular member to wrap around an object for securing the bicycle frame thereto. Means are provided for attaching the first end of the securing element to the tubular member and for fastening the second end of the securing element to the bicycle frame after wrapping around the object. The securing element may be an elongated, interconnected, linkage assembly or it may consist of a flexible cable. In either case, the securing element is preferably attached to a hinge pin assembly mounted inside the tubular member and including means for limiting its movement therethrough. Of course, other types of elongated, collapsible, securing elements may be employed in the practice of the invention.

In particular, the hollow tube of the seat post, and optionally, the handle bar tubing, is made available to house the bicycle locking mechanism of the invention while the locking mechanism is not in use and security of the bicycle is not necessary. Accordingly, the locking mechanism of the invention presents no visual distraction to the bicycle itself and preserves the aesthetic purity of the bicycle which is so important to many cycling enthusiasts.

By incorporating the locking mechanism into the existing seat post assembly, for example, the need to provide additional cable, chain, or locks to secure this assembly is eliminated. This in turn offers the advantage of reduced complexity and weight of total components typically functioning for security purposes only.

Inherently, the locking mechanism offers extreme portability in that it is entirely self contained within the existing structure of the bicycle frame. Therefore, there is no chance of the locking mechanism interfering with the rider as is often the case in the mounting and storing of locks typically in the prior art.

Additionally, proper design can be employed to eliminate the tendency for the subcomponents of the locking mechanism to rattle while in transit. Consequently, the elimination of extraneous rattle noises allows the cyclist to more accurately assess the mechanical state of his bicycle while riding it which may often be deemed critical to the rider.

DESCRIPTION OF THE PREFERRED EMBODIMENTS

Figure 1:
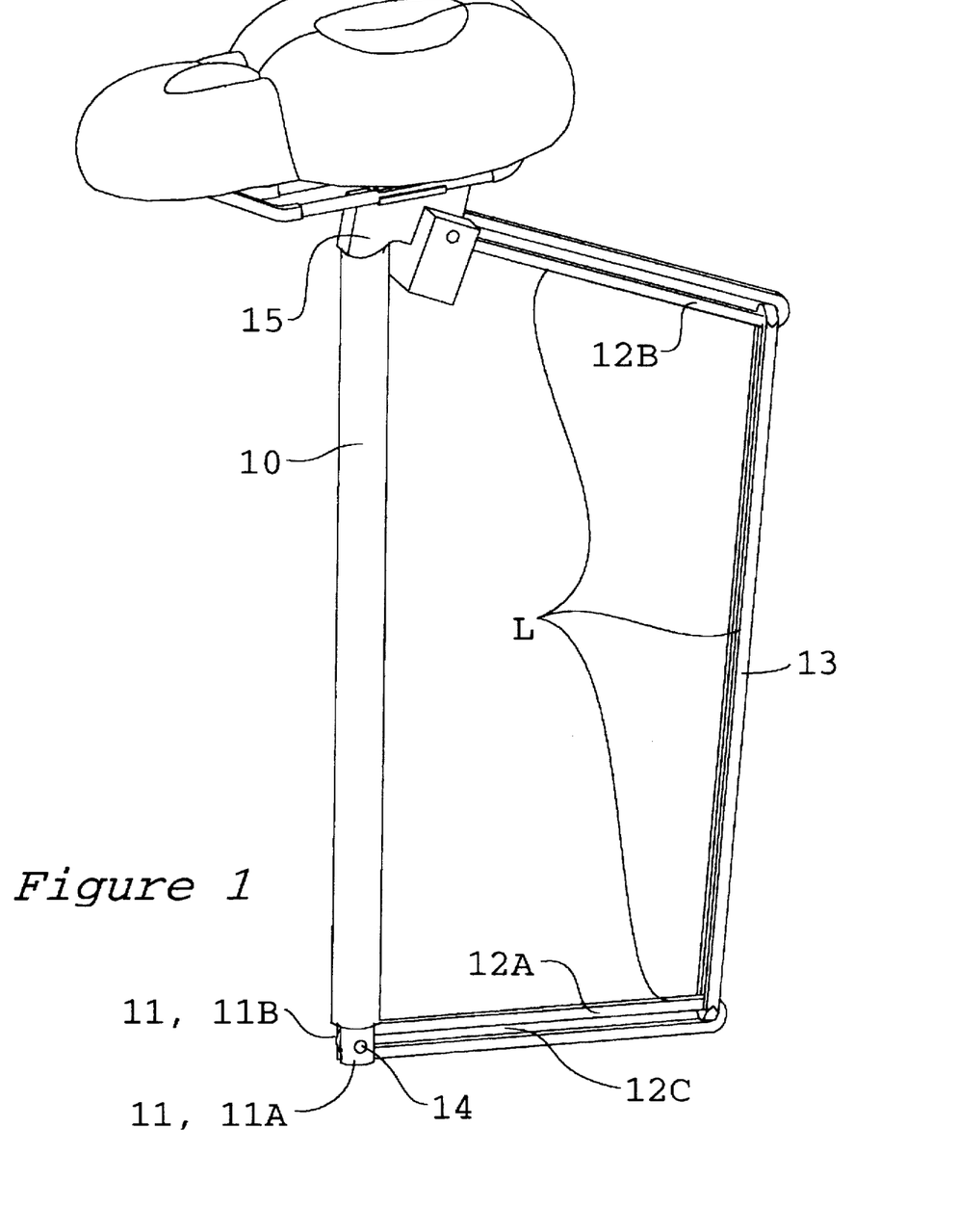
FIG. 1 is an isometric view of a bicycle seat and seat post incorporating a locking mechanism according to the invention.

Referring now to the drawing and more particularly to FIG. 1, there is shown a bicycle locking mechanism embodying the invention. As shown, the locking mechanism is preferably trapezoidal in shape and includes as one leg thereof a tubular post 10 having an outside diameter appropriate for a slip fit into a tubular bicycle frame. A typical bicycle frame is shown, for example, in FIG. 5. The inside diameter of the tubular post 10 is preferably made as large as possible while at the same time maintaining the necessary structural integrity typically required by a bicycle seat post.

An elongated, collapsible, securing element denoted by the reference letter "L" is provided and forms the other legs of the trapezoidal locking mechanism according to the invention. The collapsible, securing element in this embodiment comprises a linkage assembly including two half length linkages 12a and 12b and a full length linkage 13.

A retractable hinge stop 11 is inserted into the lower end of tubular post 10. The hinge stop 11 is of cylindrical shape and has an outside diameter no greater than required for a slip fit into the tubular post 10. The hinge stop 11 provides a hinge point around a hinge pin 14 for rotatably joining thereto the half length linkage member 12a and concurrently provides a mating mechanism to the tubular post 10. The hinge pin 14 is positionally fixed to retractable hinge stop 11, through two ears 11a and 11b extending axially from the cylindrical portion of the retractable hinge stop 11.

The half length linkage 12a is sandwiched at one end between the ears 11a, 11b and forms the first segment or link in the collapsible securing element L. The half length linkage 12a is an oblong member of rigid material having an elongated slot 12c formed in the central portion thereof. The length of the linkage 12a is no greater than half the length of tubular post 10 and its width is no greater than the inside diameter of tubular post 10. The depth of the linkage 12a is no greater than the distance between the two ears 11a, 11b of retractable hinge stop 11.

The linkage 12a is positioned so that hinge pin 14 resides within the slot 12c, the width of which is no less than the diameter of hinge pin 14. The slot 12c extends lengthwise to within approximately the diameter of the hinge pin 14 at each end of the linkage 12a. Optionally, each end of half length linkage 12a may be suitably rounded to accommodate pivoting and rotation of adjacent components so as to minimized interference.

The second segment or link in the collapsible securing element L is the full length linkage 13. The full length linkage 13 is an oblong member of rigid material having an elongated slot 12c also formed in the central portion thereof. The linkage 13 has a length which is no greater than the length of tubular post 10 and a width which is no greater than the inside diameter of tubular post 10. The depth of the linkage 13 is again no greater than the distance between the ears 11a, 11b of the retractable hinge stop 11. The linkage 13 is similar in structure to half length linkage 12a, except that its length is approximately double that of the half length linkage members.

The full length linkage 13 is linked to half length linkage 12a in a manner similar to a typical chain. Each of the links, i.e., half length linkage 12a and full length linkage 13, is interlocked within the closed loop structure of the adjoining linkage, and approximately perpendicular axially to the corresponding adjoining linkage.

Figure 4:
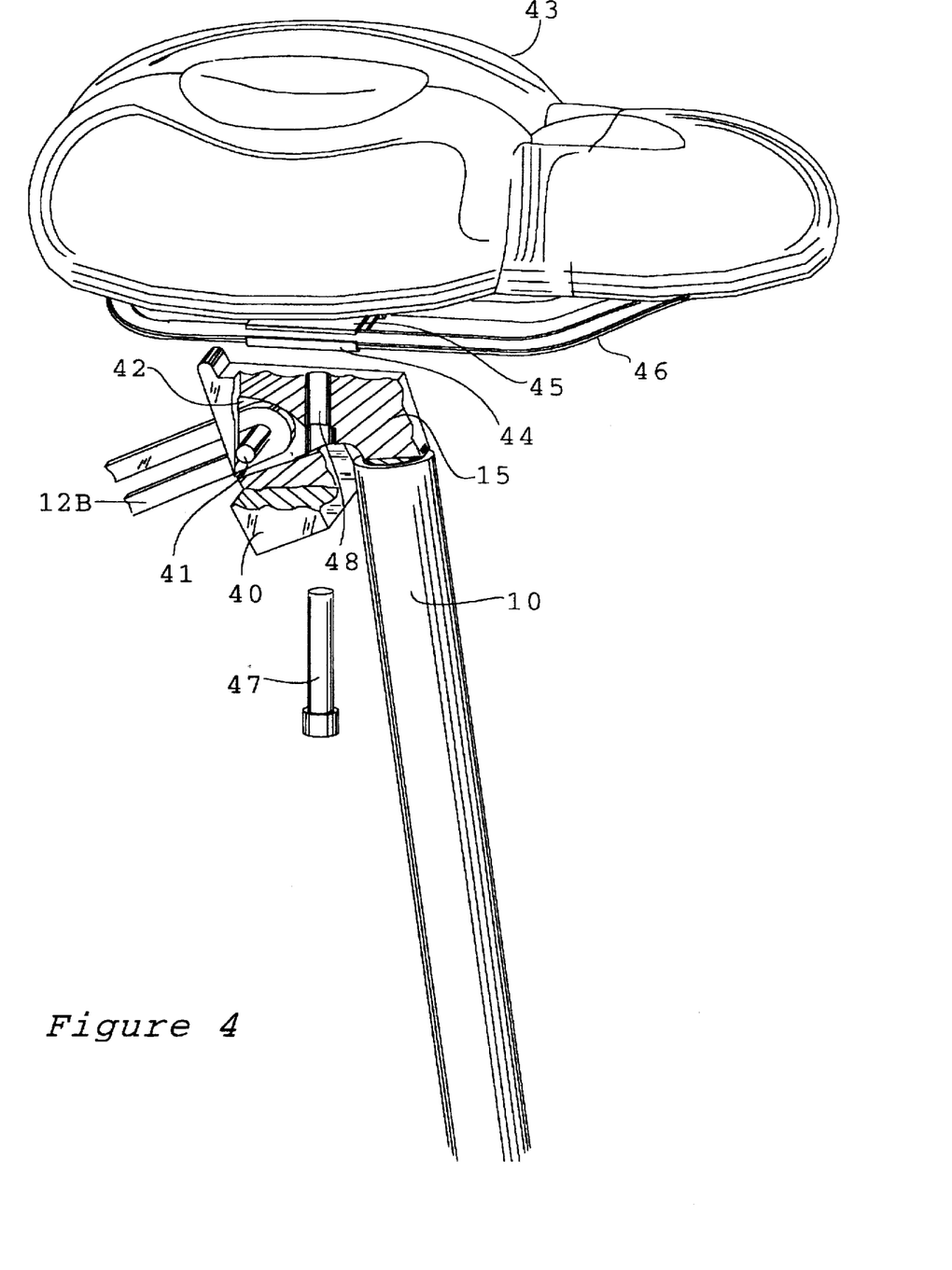
FIG. 4 is an isometric, partially exploded, cut away view of the bicycle seat and seat post showing the underside of the seat while in the locked position.

The third segment or link in the collapsible, securing element L is the half length linkage 12b. The half length linkage 12b is identical in shape and form to half length linkage 12a. This linkage 12b is similarly linked to full length linkage 13 in the same manner as half length linkage 12a at the opposite end of full length linkage 13. The locking mechanism is closed via a locking device designed to pin half length linkage 12b to saddle mount base 15 as shown in FIG. 4.

Figure 2:
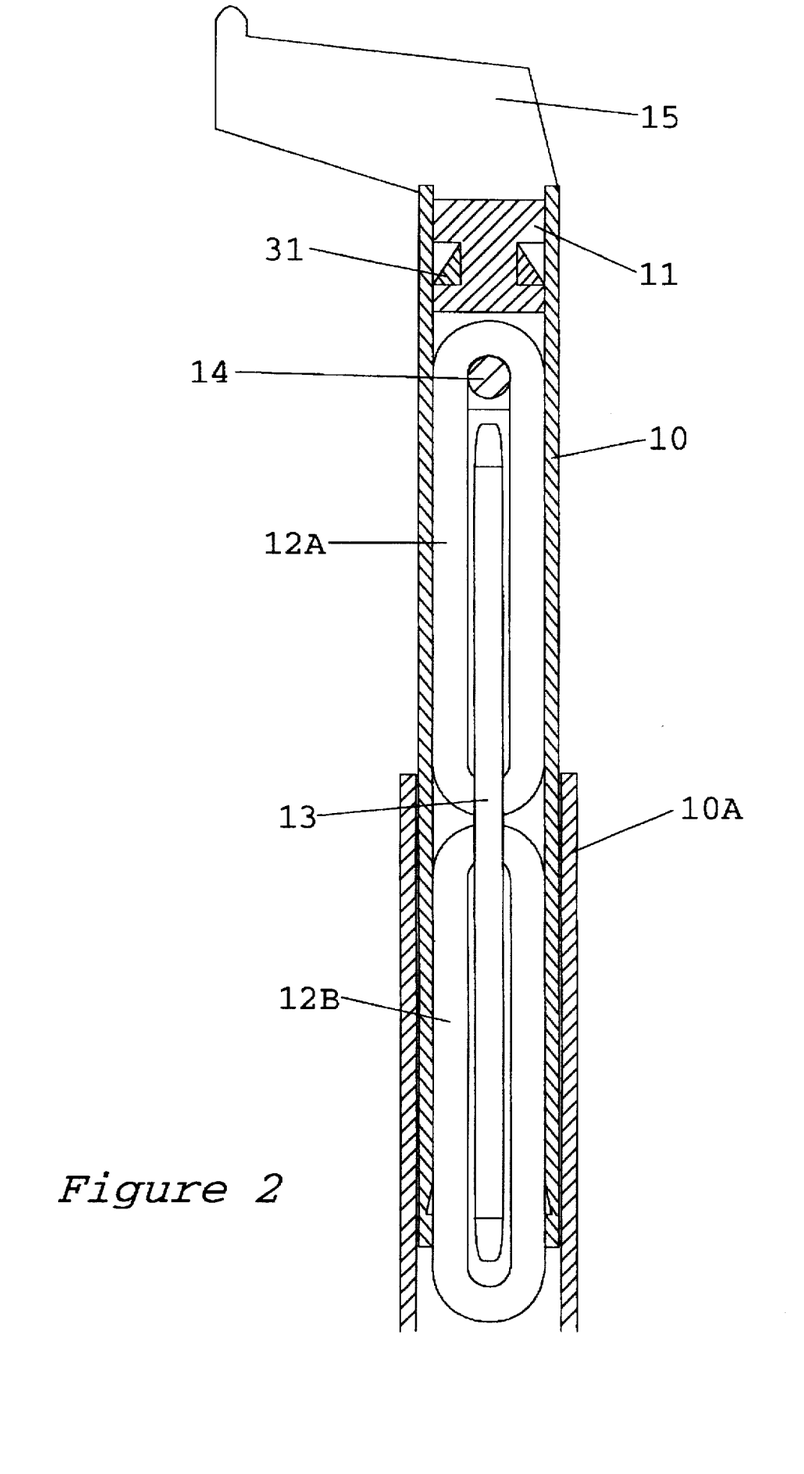
FIG. 2 is an elevational, sectional view of the bicycle seat post shown in FIG. 1 with the locking mechanism in the portable or retracted position.

The saddle mount base 15 is affixed to tubular post 10 so that they behave as one inseparable mechanical unit. The function of the locking mechanism is such as to allow several mechanical linkages to unfold from a compacted position as depicted in FIG. 2, and rotate to the desired orientation. The linkages form a closed loop when half length linkage 12b is pinned in place to saddle mount base 15. The closed loop functions to secure the bicycle when the linkages are threaded through the bicycle frame and wheels, for example. Further security is afforded when the loop is concurrently closed around a secure object such as a bike rack or the like.

FIG. 2 shows the locking mechanism in the portable and retracted position. The lock components including the retractable hinge stop 11, half length linkages 12a and 12b, and the full length linkage 13, are preferably all contained within the lumen of the tubular post 10, except for a small portion left extending for grasping by the user. The retractable hinge stop 11 is slid up into the tubular post 10 in the direction of saddle mount base 15.

The half length linkage 12a lies along the axis of tubular post 10 and is positioned relative to the hinge pin 14, and the walls of the tubular post 10.

The full length linkage 13 is vertically positioned wherein the upper end of the linkage is abutted against the ears 11a, 11b of retractable hinge stop 11 and is axially located along the tubular post 10 axis by the surrounding tubular post 10 walls. The full length linkage 13 is further constrained so that it remains perpendicular to half length linkages 12a and 12b.

The half length linkage 12b is vertically positioned wherein the upper end of the linkage is abutted against the lower end of half length linkage 12a, and axially located along the tubular post 10 axis by the surrounding walls of tubular post 10.

By using the physical arrangement of components as depicted in FIG. 2, self containment of the locking mechanism and all its subcomponents is readily achieved according to the invention. Retractable hinge stop 11, half length linkages 12a and 12b, and full length linkage 13 are preferably all contained within the lumen of tubular post 10. In the event that additional length of the trapezoidal locking mechanism is desired, a substantial portion of linkages 12a, 12b and 13 may optionally be lengthened to extend from the lumen of tubular post 10.

Figure 3:
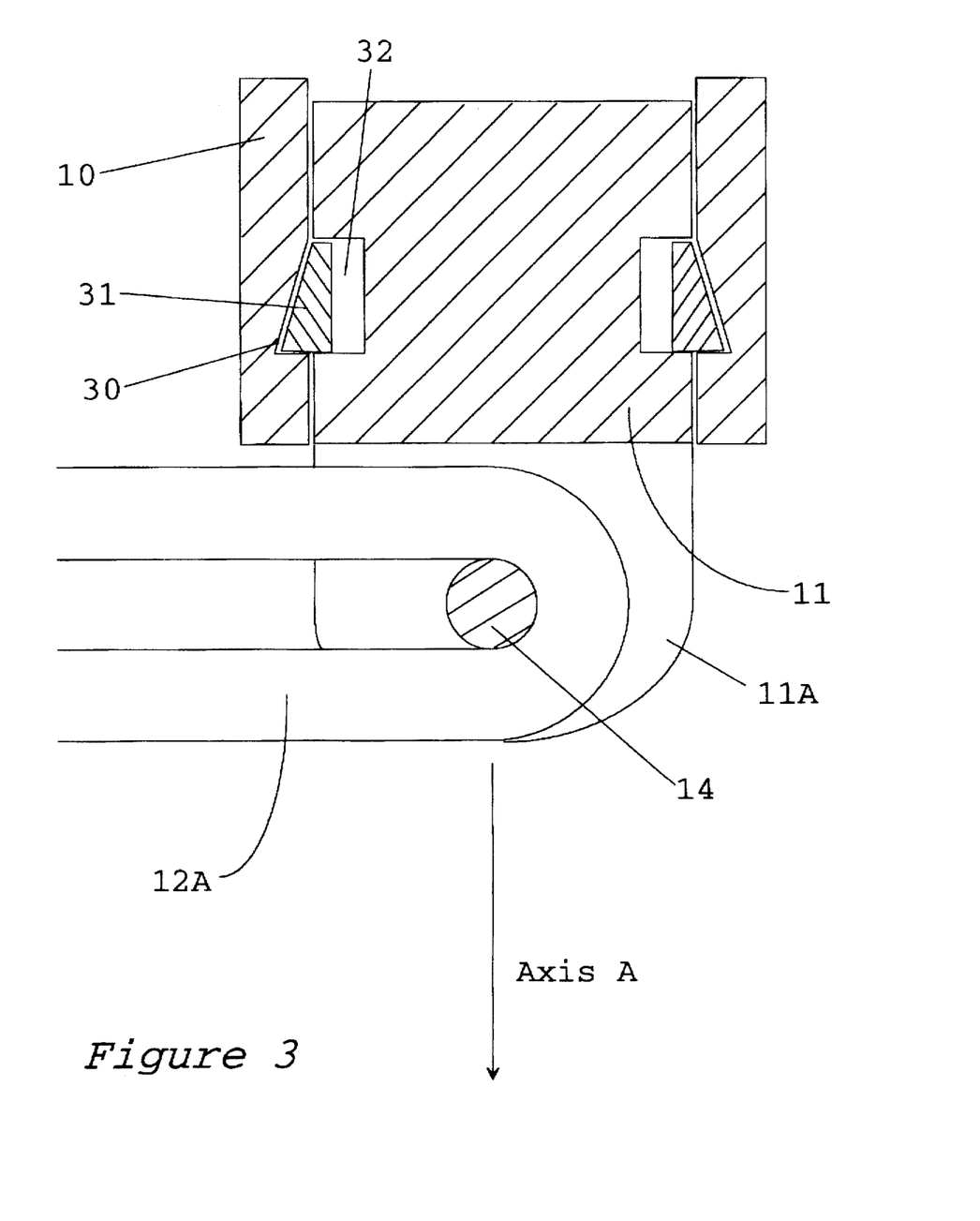
FIG. 3 is a cross sectional view of the lower portion of the bicycle seat post showing a linkage assembly responsible for limiting the extraction of the locking mechanism from the seat post.

It is realized that necessary constraints to the movement of retractable hinge stop 11 must be provided to maintain a secure loop when the locking mechanism is in the locked position. The diameter of the cylindrical portion of retractable hinge stop 11 inherently restricts movement to only along the axis of tubular post 10 as depicted at A. Axial movement is limited, when in the retracted position, by the saddle mount base affixed to the upper end of the tubular post 10. Referring to FIG. 3, the lower limit of axial movement is achieved by the insertion of an annular tapered split ring 31, into the hinge stop groove 32. Hinge stop groove 32 is of sufficient depth to allow compression of annular tapered split ring 31 so that the outermost edge of the split ring can compress minimally to the inside diameter of tubular post 10. Near the lower end of the tubular post 10, and on the inner diameter of said tubular post 10, a detente 30 is of a right triangle profile, with the angle of the hypotenuse equal to that of the profile of the annular tapered split ring 31. It will become apparent to those skilled in the art that upward axial movement of retractable hinge stop 11 is allowed provided proper alignment of half length linkage 12a, while downward axial movement of said retractable hinge stop 11 is limited when the annular tapered split ring 31 decompresses to fill the expansion of tubular post detente 30. This limitation of movement is a necessary mechanism to provide security while in the locked position, and retractability while in the transport position.

FIG. 3 also depicts the positioning of half length linkage 12a with respect to hinge pin 14 and retractable hinge stop 11. Based on the length of retractable hinge stop 11, the relative affixment of hinge pin 14, and the clearance provided, half length linkage 12a is minimally rotatable to and position between the 3 o'clock and 9 o'clock positions.

Referring to FIG. 4, saddle or seat mount base 15 is permanently affixed to tubular post 10 by any one of several different means such as a weldment, interference fit, permanent clamping device, or other means well known to those skilled in the art. The seat mount base 15 functionally provides a mounting structure to which a saddle 43, through its interim clamping structure, can be attached. The saddle mount base 15 also provides the housing structure necessary to capture half length linkage 12b when required for the locked position. To achieve a permanent attachment of the saddle 43, a through hole with a counter bored end 48 is provided for clearance of a typical socket head screw. A saddle mount clamp screw 47 is inserted through saddle mount base screw bore 48, saddle mount bracket 44, and threaded into saddle mount bracket clamp 45. A saddle support frame 46 supplies integral rod members which in turn are clamped by rotational tightening of saddle mount clamp screw 47. Since an object of this invention is to provide security against theft of the saddle 43, the saddle mount clamp screw head is intentionally rendered inaccessible when the clevis shaped pin lock body 40 is in its depicted secured position.

The saddle mount base 15 contains a mortised slot to the lower rear portion of its structure to accommodate the passage of half length linkage 12b into the mortised slot. Upon proper alignment of half length linkage 12b with a through hole provided in saddle mount base 15 accommodating pin lock pin 41, the insertion and locking of pin lock pin 41 secures half length linkage 12b in saddle mount base 15. The locking of the pin lock achieves closure to the trapezoidal locking mechanism according to the invention, thus integrally securing the saddle and bicycle around which it is intended to be looped.

Pin lock body 40 is a removable channel structure through which passes pin lock pin 41. The pin lock pin 41 passes through one wall of the channel and locks within the other. By carefully designing the outer shape of saddle mount base 15 to match the channel dimensions of the pin lock body 40, a custom matching snug fit can be achieved, thus eliminating extraneous rattling noise. Also critical to the security function of the locking device, is assuring correct positioning of the pin lock body 40 over the head of the aforementioned saddle mount clamp screw 47. Desired correct positioning is simply achieved by extending the outer shape of saddle mount base 15 so that any pivot or rotation of pin lock body 40 about pin lock pin 41 is constrained by the inherent interference in the channel of the pin lock body.

Figure 5:
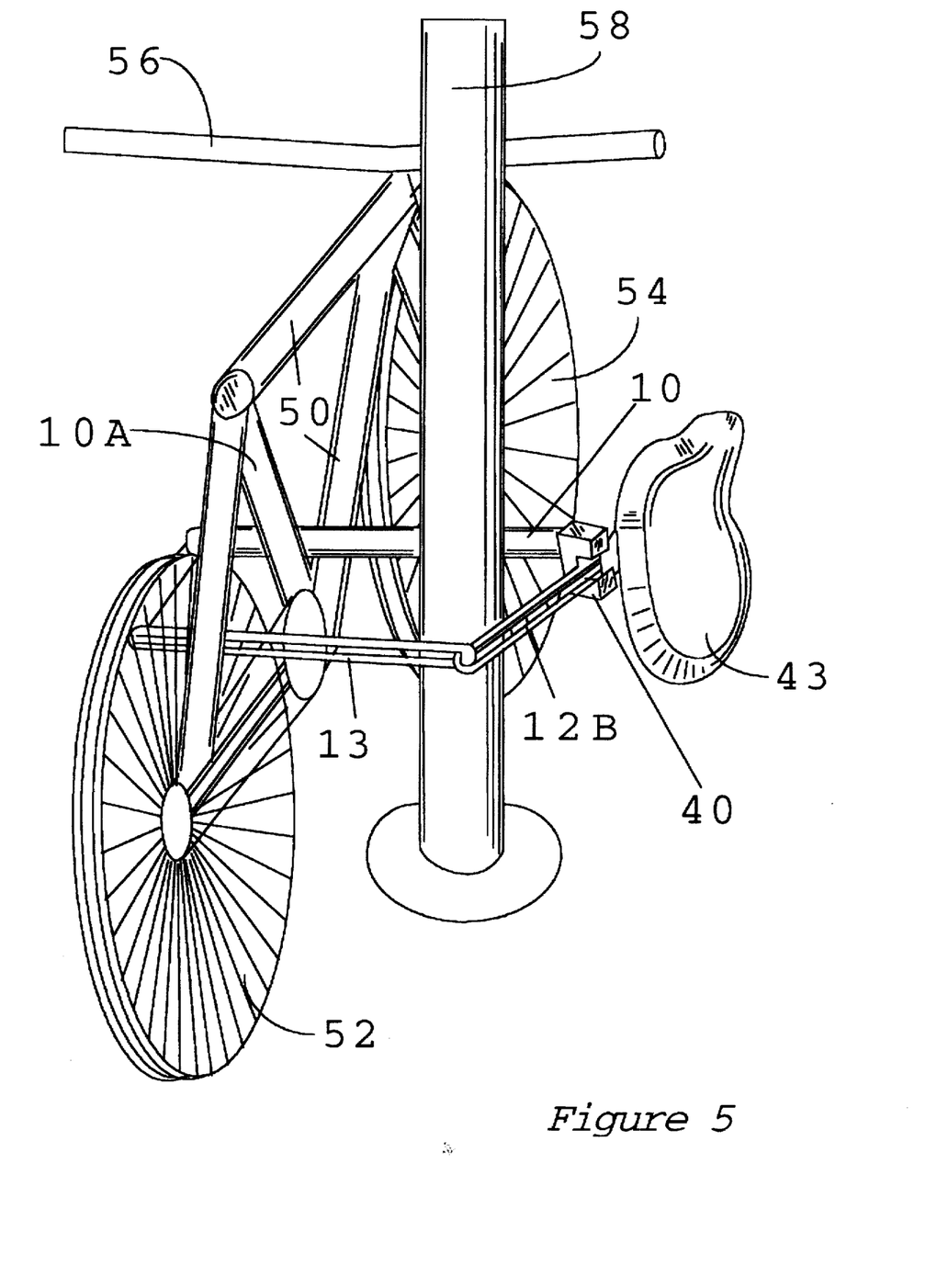
FIG. 5 is a perspective view of a bicycle using the locking mechanism to secure the bike to a post.

Referring to FIG. 5, the use of the integral post locking mechanism is demonstrated as it may used to secure a bicycle to a rigid post such as a street lamp 58 or the like. The bicycle includes the usual bicycle frame 50 to which are mounted a pair of bicycle wheels 52 and 54 and handle bars 56. The proportioning of the post length and the corresponding linkages is optimally capable of including a primary bicycle frame member and minimally one wheel while having adequate space left within the trapezoidal loop for encircling the rigid post.

Figure 6:
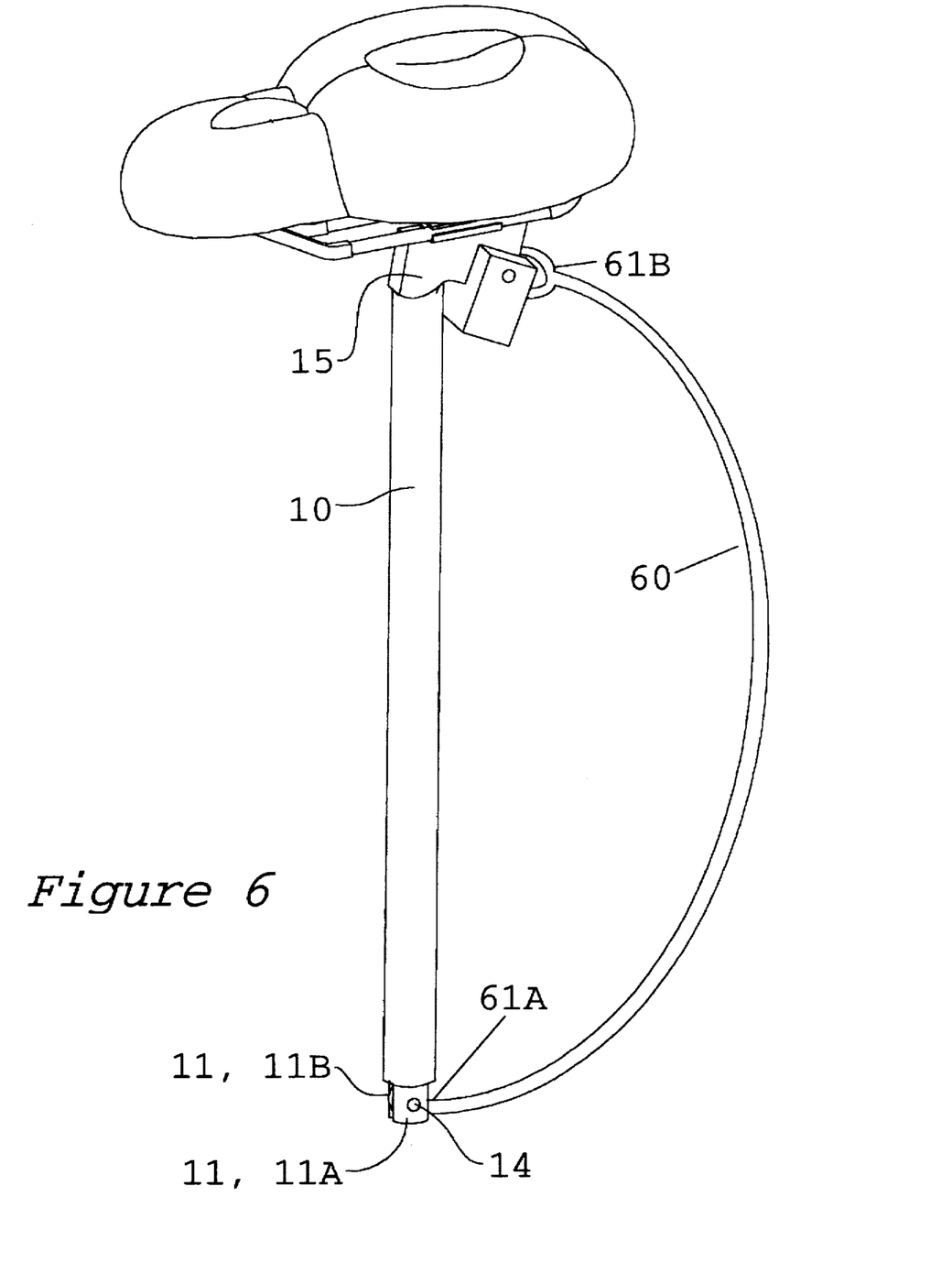
FIG. 6 is a perspective view of an alternative locking mechanism using cable rather than firm linkage.
Figure 7:
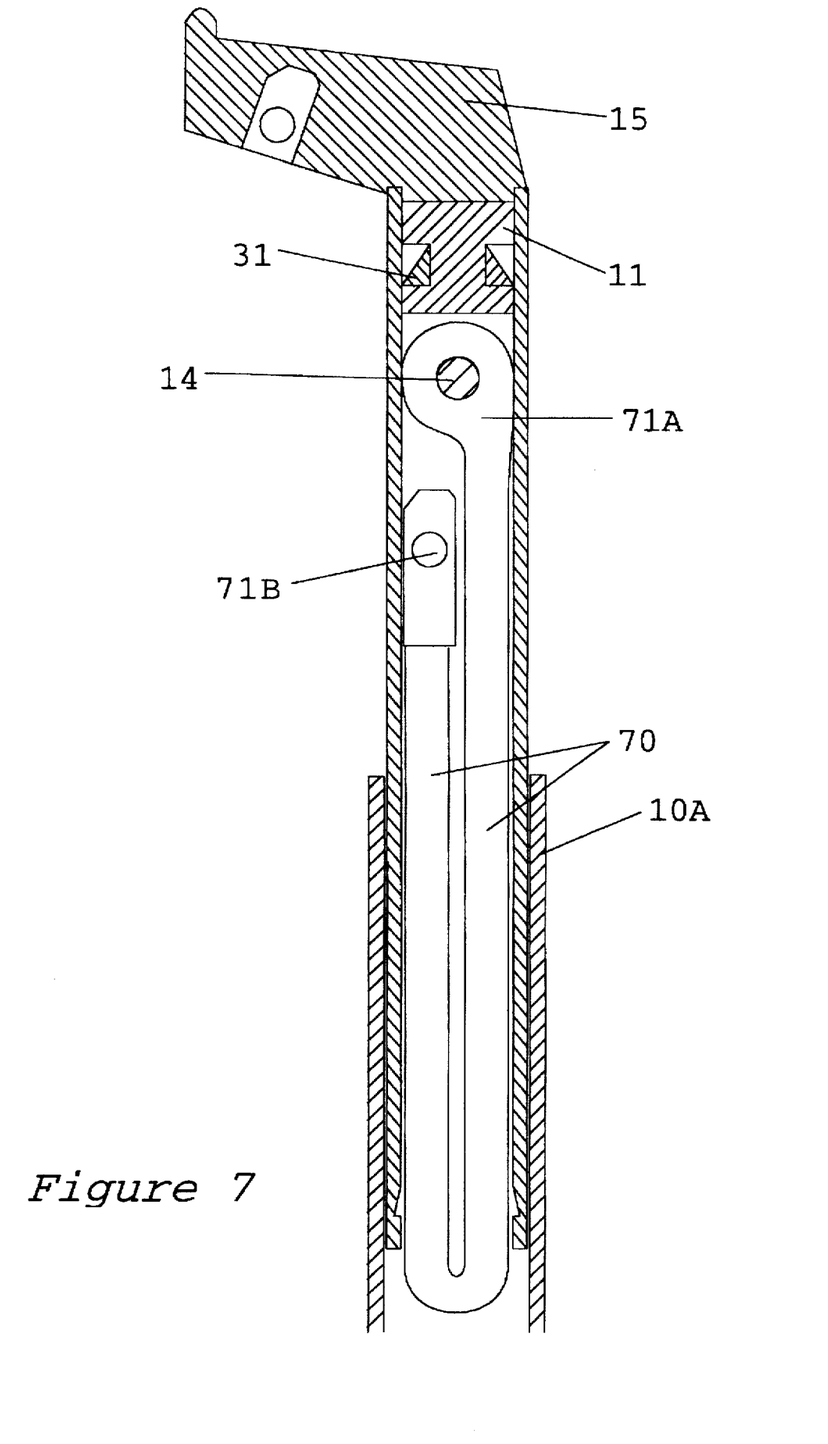
FIG. 7 is a view similar to FIG. 2 but showing another embodiment of the invention.
Figure 8:
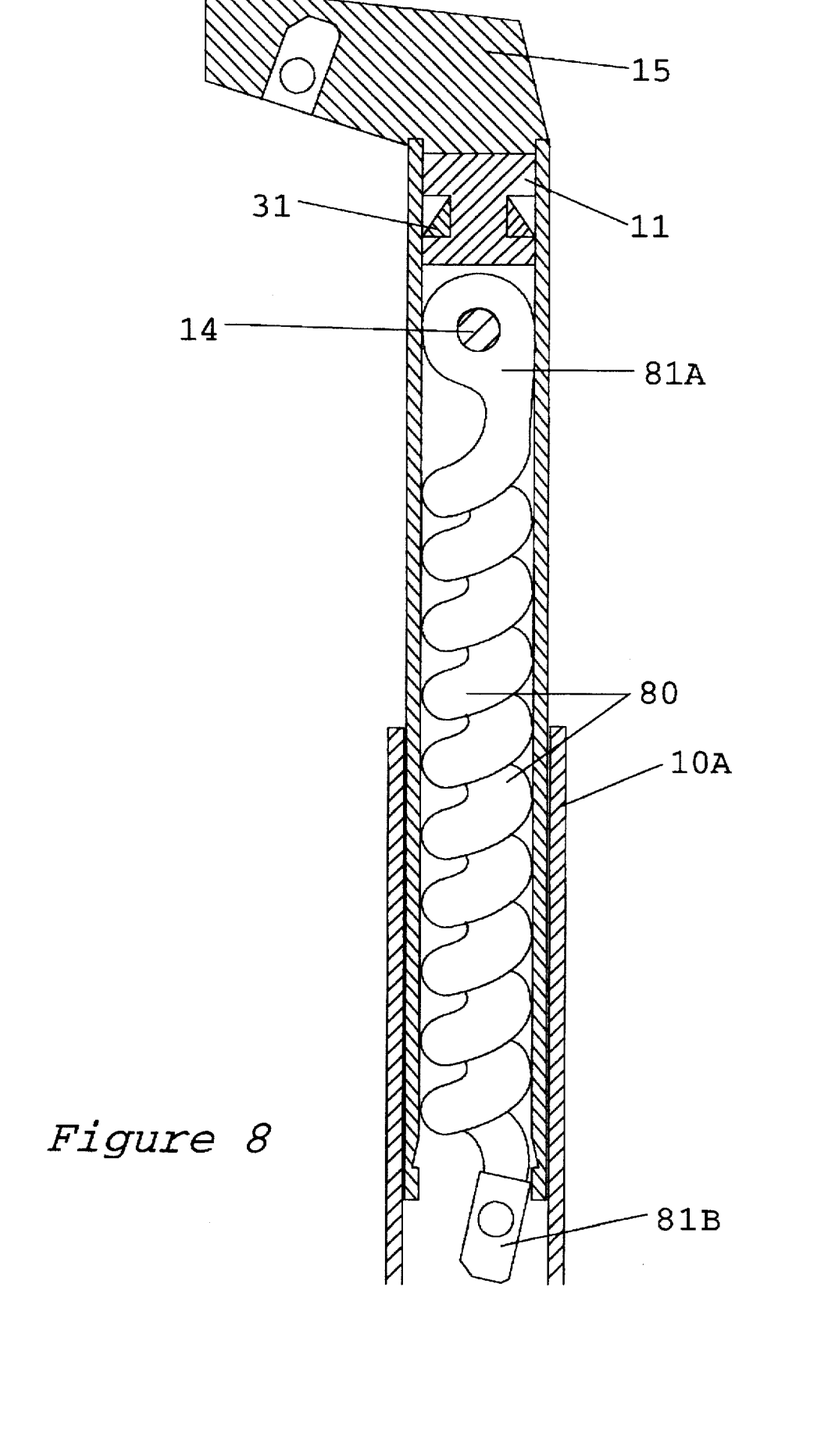
FIG. 8 is a similar view showing still another embodiment of the invention.

An alternative bicycle locking mechanism according to the invention is shown in FIG. 6. This locking mechanism uses an elongated cable as the collapsible securing element rather than a firm linkage described hereinabove. The linkages 12a, 12b, and 13 of FIG. 1, are all replaced by a single cable of substantial strength with a loop or other means of affixment on each end 61a and 61b. The loop 61a is pinned using hinge pin 14, while loop 61b remains unattached until it is desired to achieve the locked state. To achieve the locked state, loop 61b is inserted into the mortised slot of saddle mount base 15, and pin lock pin 41 is inserted in the loop 61b and subsequently locked, thus securing the cable to saddle mount base 15. Similarly to the structure shown in FIG. 2, the cable configuration is substantially contained within the lumen of the tubular post 10 when stored in the transporting position. To achieve the minimal required length of the cable 60, which must be greater than the length of tubular post 10, cable 60 can be doubled over as shown in FIG. 7 provided the cable diameter is less than half the inside diameter of tubular post 10 or the cable can be spiralled into coiled segments as shown in FIG. 8. The design considerations regarding strength, flexibility, cost of manufacture, and containment yields a preferred configuration of either rigid linkage of FIG. 1 or the pliable cable method of FIG. 6.

It will now be apparent to those skilled in the art, that this form of integral saddle post locking mechanism provides inherent portability, security, possible reduction in weight, integral attachment of the seat post and saddle itself while in the locked state, reduction in visual distractions from the intended aesthetic look of the bicycle, and reduction in mechanical bulk which can potentially interfere with cycling and/or induce unwanted rattling while cycling. While several preferred embodiments of the novel integral saddle post locking mechanism according to the invention have been described in detail herein, many variations and modifications are possible as will readily occur to those skilled in the art.

What is claimed is:

1. A quick release bicycle seat and locking mechanism for preventing theft of a bicycle, said bicycle seat and locking mechanism comprising, in combination:

a tubular post of predetermined length having first and second ends;

a bicycle seat affixed to said first end of said tubular post;

an elongated securing element having first and second ends, said securing element fitting through said tubular post and being substantially contained within said tubular post when not in use, said securing element to be withdrawn from said second end of said tubular post after removal of said bicycle seat from the frame of the bicycle and adapted for wrapping around an object for securing said bicycle to said object;

means for attaching said first end of said securing element to said tubular post, and means for fastening said second end of said securing element to said tubular post or said seat after wrapping around said object.

2. A locking mechanism according to claim 1, wherein said elongated securing element is collapsible and has a normally operative length which is greater than the length of said tubular post, said securing element being collapsed in size to a length which is no greater than the length of said tubular post such that said collapsed securing element fits substantially within said tubular post when not in use.

3. A locking mechanism according to claim 2, wherein said attaching means comprises a retractable, cylindrical hinge stop of a size sufficient to slip fit inside said first end of said tubular post, said hinge stop including a hinge pin and means for limiting movement of said stop from inside said tubular post, except for a portion thereof carrying said hinge pin.

4. A locking mechanism according to claim 3, wherein said elongated, collapsible, securing element comprises a plurality of oblong, interconnected linkage members.

5. A locking mechanism for preventing theft of a bicycle, said locking mechanism comprising, in combination:

a tubular post of predetermined length having first and second ends;

a bicycle seat affixed to said first end of said tubular post;

an elongated linkage assembly having opposite ends and a normally operative length which is greater than the length of said tubular post, said linkage assembly comprising a plurality of oblong, interconnected linkage members including first, second and third linkage members, said first and third linkage members being approximately half the length of said tubular post and said second linkage member being approximately the full length of said tubular post, said linkage members forming together with said tubular post a substantially trapezoidal configuration, said linkage assembly being collapsed in size between said opposite ends to a length that is no greater than the length of said tubular post, said linkage assembly fitting through said second end of said tubular post and being substantially contained within said tubular post when not in use, said linkage assembly being adapted for withdrawal from said second end of said tubular post to wrap around an object for securing said bicycle to said object;

a retractable, cylindrical hinge stop of a size sufficient to slip fit inside said second end of said tubular post, said hinge stop including a hinge pin attached to one end of said linkage assembly and means for limiting movement of said stop through said second end of tubular post, except for a portion thereof carrying said hinge pin; and means for fastening said second end of said securing element to said tubular post or said seat after wrapping around said object.

6. A locking mechanism according to claim 5, wherein each of said linkage members has a width no greater than the inside diameter of said tubular post and an oblong center slot of a width no less than the diameter of said hinge pin, said hinge pin being slidably mounted within the center slot of said first linkage member.

7. A locking mechanism according to claim 6, wherein the slot in each of said linkage members extends lengthwise to within approximately the diameter of said hinge pin at each end of said linkage member.

8. A locking mechanism for preventing theft of a bicycle, said locking mechanism comprising, in combination:

a tubular post of predetermined length having first and second ends;

a bicycle seat affixed to said first end of said tubular post;

an elongated, interconnected linkage assembly having opposite ends and a normally operative length which is greater than the length of said tubular post, said linkage assembly comprising a plurality of linkage members including first, second and third linkage members, said first and third linkage members being approximately half the length of said tubular post and said second linkage member being approximately the full length of said tubular post, said linkage members forming together with said tubular post a substantially trapezoidal configuration, said linkage assembly being collapsed in size between said opposite ends to a length that is no greater than the length of said tubular post, said linkage assembly fitting through said second end of said tubular post and being substantially contained within said tubular post when not in use, said linkage assembly being adapted for withdrawal from said second end of said tubular post to wrap around an object for securing said bicycle to said object;

a retractable, cylindrical hinge stop of a size sufficient to slip fit inside said second end of said tubular post, said hinge stop including a hinge pin attached to one end of said linkage assembly and means for limiting movement of said stop through said second end of tubular post, except for a portion thereof carrying said hinge pin;

each of said linkage members having a width no greater than the inside diameter of said tubular post and an oblong center slot of a width no less than the diameter of said hinge pin, the slot in each of said linkage members extending lengthwise to within approximately the diameter of said hinge pin at each end of said linkage member, said hinge pin being slidably mounted within the center slot of said first linkage member, said retractable hinge stop including a pair of spaced apart ear members, the distance between which is approximately equal to the depth of said first linkage member, said hinge pin being mounted through said pair of ear members and passing through the slot of said first linkage member; and means for fastening said second end of said securing element to said tubular post or said seat after wrapping around said object.

9. A locking mechanism according to claim 8, wherein the slot in each of said linkage members is rounded at the opposite ends thereof.

10. A locking mechanism according to claim 9, wherein said fastening means includes a base member mounted to said first end of said tubular post, said base member including a mortised slot for receiving a portion of said third linkage member and a locking pin extending through said base member and said oblong slot of said third linkage member.

11. A locking mechanism according to claim 3, wherein said elongated, collapsible, securing element comprises a flexible cable having first and second ends.

12. A locking mechanism according to claim 11, wherein said flexible cable is coiled to a length which is no greater than the length of the cavity defined by said tubular post.

13. A locking mechanism according to claim 11, wherein said flexible cable is folded upon itself to a size which is no greater than the length of the cavity defined by said tubular post.

14. A locking mechanism according to claim 11, wherein said flexible cable has a loop at end which is affixed to said hinge stop.

15. A locking mechanism according to claim 14, wherein said flexible cable has at the opposite end thereof a means for engagement with said fastening means.

16. A bicycle comprising, in combination:

a frame including a tubular portion having an open end;

a bicycle seat;

a tubular post of predetermined length having first and second ends, said bicycle seat being affixed to said first end of said tubular post, said tubular post fitting through said open end of said tubular portion of said frame with said second end of said post being positioned at a location within said tubular portion that is remote from said open end;

an elongated, interconnected linkage assembly having opposite ends and a normally operative length which is greater than the length of said tubular post, said linkage assembly being collapsed in size between said opposite ends to a length that is no greater than the length of said tubular post, said linkage assembly fitting through said second end of said tubular post and being substantially contained within said tubular post when not in use, said linkage assembly being adapted upon withdrawal from said tubular member to wraparound an object for securing said bicycle frame to said object;

a retractable, cylindrical hinge stop of a size sufficient to slip fit inside said tubular post, said hinge stop including a hinge pin attached to one end of said linkage assembly and means for limiting movement of said stop through said second end of said tubular post, except for a portion thereof carrying said hinge pin; and a base member affixed to said first end of said tubular post for supporting said bicycle seat, said base member including means for receiving the other opposite end of said linkage assembly in locked engagement therewith.

17. A bicycle according to claim 16, wherein said linkage assembly includes first, second and third linkage members, said first and third linkage members being approximately half the length of said tubular post and said second linkage member being approximately the full length of said tubular post, said linkage members forming together with said tubular post a substantial trapezoidal configuration.

18. A bicycle comprising, in combination:

a frame including a tubular portion having an open end;

a bicycle seat;

a tubular post of predetermined length having first and second ends, said bicycle seat being affixed to said first end of said tubular post, said tubular post fitting through said open end of said tubular portion of said frame with said second end of said post being positioned at a location within said tubular portion that is remote from said open end;

an elongated, flexible cable having first and second ends, said flexible cable fitting through said second end of said tubular post and being substantially contained within said tubular post when not in use, said flexible cable being adapted for withdrawal from said second end of said tubular post after withdrawing said tubular post from said tubular portion of said frame to wrap around an object for securing said bicycle frame to said object;

a retractable hinge stop of a size sufficient to fit inside said tubular post, said hinge stop including means for attachment to said first end of said flexible cable and means for limiting movement of said stop through said second end of said tubular post, said flexible cable being retractable within said tubular post along with said stop; and a base member affixed to said first end of said tubular post for supporting said bicycle seat, said base member including means for receiving said second end of said flexible cable in locked engagement therewith.

19. A bicycle according to claim 18, wherein said elongated, flexible cable has a normally operative length which is greater than the length of said tubular post, said flexible cable being collapsed in size between said first and second ends to a length that is no greater than the length of said tubular post, and wherein said means for attachment includes a hinge pin mounted to said hinge stop and attached to said first end of said flexible cable.

20. A locking mechanism according to claim 19, wherein said flexible cable has at said second end thereof means for engagement with said base member.

* * * * *